US012565364B2

(12) United States Patent
Xiao

(10) Patent No.: US 12,565,364 B2
(45) Date of Patent: Mar. 3, 2026

(54) PAINTING MIXING CUP WITH GUIDE FUNCTION

(71) Applicant: QINGDAO HANBO PLASTIC TECHNOLOGY CO., LTD., Qingdao (CN)

(72) Inventor: Yun Xiao, Qingdao (CN)

(73) Assignee: QINGDAO HANBO PLASTIC TECHNOLOGY CO., LTD., Qingdao (CN)

( * ) Notice: Subject to any disclaimer, the term of this patent is extended or adjusted under 35 U.S.C. 154(b) by 150 days.

(21) Appl. No.: 18/578,518

(22) PCT Filed: Jun. 24, 2022

(86) PCT No.: PCT/CN2022/101231
§ 371 (c)(1),
(2) Date: Jan. 11, 2024

(87) PCT Pub. No.: WO2023/284532
PCT Pub. Date: Jan. 19, 2023

(65) Prior Publication Data

US 2024/0294309 A1 Sep. 5, 2024

(30) Foreign Application Priority Data

Jul. 13, 2021 (CN) ......................... 202121593544.5

(51) Int. Cl.
*B65D 51/18* (2006.01)
*B44D 3/12* (2006.01)
*B65D 47/32* (2006.01)

(52) U.S. Cl.
CPC ............. *B65D 51/18* (2013.01); *B44D 3/127* (2013.01); *B65D 47/32* (2013.01); *B65D 2251/0018* (2013.01); *B65D 2251/0087* (2013.01)

(58) Field of Classification Search
CPC ...... B65D 51/18; B65D 47/121; B65D 47/32; B65D 2251/0018; B65D 2251/0087;
(Continued)

(56) References Cited

U.S. PATENT DOCUMENTS 11,147,402 B2 * 10/2021 Rubin .................. B65D 41/165
2006/0261067 A1 * 11/2006 Letica ................ B65D 43/0212 220/780
2019/0168927 A1 * 6/2019 Tyler ...................... B65D 25/00

FOREIGN PATENT DOCUMENTS

CN 206734926 U 12/2017
CN 209177223 U 7/2019
(Continued)

OTHER PUBLICATIONS

International Search report issued on Aug. 26, 2022 in corresponding application No. PCT/CN2022/101231; 5 pages.

*Primary Examiner* — David J Walczak
(74) *Attorney, Agent, or Firm* — Maier & Maier, PLLC

(57) ABSTRACT

A painting mixing cup with a guide function, including a ring-shaped sealing surface that is arranged on an inner surface of an upper edge of the cup body, and a clip angle between the ring-shaped sealing surface and a vertical plane is 2°~6°; the cup body is arranged with a guide cover, and the guide cover includes a clamping sealing structure, and an inner surface of a first ring-shaped plate of the clamping sealing structure cooperates with the ring-shaped sealing surface to form a sealing structure. A reinforcing portion is arranged at the middle part of the guide cover. Meanwhile, the balanced air hole is opened when pouring paint, and the diameter of the guide channel is much smaller than that of the paint mixing cup, so that the user can accurately control the pouring speed of the paint.

7 Claims, 6 Drawing Sheets

(58) Field of Classification Search
CPC ...... B65D 47/06; B65D 47/12; B65D 47/127; B65D 47/147; B44D 3/127
USPC ......................... 222/566, 570, 567, 573, 574
See application file for complete search history.

(56) References Cited

FOREIGN PATENT DOCUMENTS

| | | | |
|---|---|---|---|
| CN | 213376434 | U | 6/2021 |
| CN | 213385127 | U | 6/2021 |
| CN | 213443814 | U | 6/2021 |
| CN | 215693627 | U | 2/2022 |
| GB | 1221792 | A | 2/1971 |

* cited by examiner

PAINTING MIXING CUP WITH GUIDE FUNCTION

TECHNICAL FIELD

The present disclosure relates to the technical field of vehicle paint spraying, in particular to a painting mixing cup with guide function.

BACKGROUND

When painters paint, they need to pour paint, thinners, etc. into a hard container in proportion to mix paint. In the prior art, the paint mixing cup is arranged with a cover, which only has the function of sealing, and its structure and function are relatively simple. When mixing paint, the cover of the cup is opened, paint and thinner are introduced into the paint mixing cup in proportion, and then the mixed paint is directly poured into a fluid supply device such as a gravity cup. In the process of pouring the paint into the fluid supply device, because the opening of the paint mixing cup is large, the cup wall and opening of the paint mixing cup are polluted in a large area, and even the outer surface of the paint mixing cup wall is stained with paint. After the paint mixing cup is used, the cover and the upper edge of the cup are stick together because the opening is polluted by paint, which increases the difficulty of opening the cover next time. The opening of paint mixing cup is generally large, so it is difficult to control the flow of paint mixing cup, especially when the cup is full of paint, which leads to a large error in the amount of paint poured into fluid supply devices such as gravity cup. For another example, the volume of the paint mixing cup is larger than that of the gravity cup and other fluid supply devices, and it needs to pour the paint into the fluid supply device for many times, so when there is still some paint in the paint mixing cup and erroneous operation occurs, the paint flows out instantly in a large area after the paint mixing cup is dumped, causing pollution and waste. In particular, the caliber of large-volume paint mixing cups is relatively large, while the caliber of fluid supply devices such as gravity cups is generally small, so when the operator directly pours paint, the flow rate is too large, and the gravity cups are often washed down, resulting in paint waste.

A multifunctional paint mixing cup for vehicle paint spraying has appeared in the market. A paint leakage port is directly arranged on the opening of the paint mixing cup, as shown in FIG. 1. However, it cannot be equipped with a corresponding cup cover, and even if the cup cover is equipped, it cannot be sealed. At the same time, the paint in the paint mixing cup cannot be poured out, and it is necessary to repeatedly open and close the cup cover to pour the paint. That is, in the prior art, during the specific operation, the paint mixing cup is in a long-term open state, which leads to the continuous volatilization of toxic substances (such as formaldehyde) in the paint and pollutes the environment in the workplace.

Therefore, the prior art still needs to be improved and developed.

SUMMARY

In view of the above shortcomings of the prior art, the purpose of the present disclosure aims to provide a painting mixing cup with guide function, which can cover the paint mixing cup and allow users to control the flow of poured paint more accurately.

To solve the above technical matters, the disclosed technical scheme of the present disclosure is as follows:

A painting mixing cup with guide function including a cup body, wherein a ring-shaped sealing surface is arranged on an inner surface of an upper edge of the cup body, and a clip angle between the ring-shaped sealing surface and a vertical plane is 2°~6°; the cup body is arranged with a guide cover, and the guide cover includes a clamping sealing structure, and an inner surface of a first ring-shaped plate of the clamping sealing structure cooperates with the ring-shaped sealing surface to form a sealing structure.

According to the painting mixing cup, a fourth ring-shaped plate is horizontally arranged on the upper edge of the cup body and a fifth ring-shaped plate is vertically arranged on an outer edge of the fourth ring-shaped plate; a flanging is formed by the fourth ring-shaped plate and the fifth ring-shaped plate, and the flanging is adapted to the clamping sealing structure.

According to the painting mixing cup, the guide cover includes a cover body, and the clamping sealing structure is arranged at an outer edge of the cover body; the clamping sealing structure includes the first ring-shaped plate vertically arranged along the outer edge of the cover body, a second ring-shaped plate is horizontally arranged at an upper edge of the first ring-shaped plate, a third ring-shaped plate is vertically arranged at an outer edge of the second ring-shaped plate; a length of the third ring-shaped plate is greater than a length of the first ring-shaped plate; an accommodation space matched with the upper edge of the cover body is formed between the first ring-shaped plate and the third ring-shaped plate, and the accommodation space is used for accommodating the flanging; a ring-shaped ridge, matched with a lower edge of the fifth ring-shaped plate, is arranged on the third ring-shaped plate.

According to the painting mixing cup, a reinforcing portion and a guide channel are arranged on the cover body; a portion of the guide channel is arranged on the reinforcing portion and a remaining portion of the guide channel is arranged on the cover body; a balanced air hole is arranged on a corresponding position of the cover body.

According to the painting mixing cup, a ring-shaped hole with a notch is arranged at middle part of the cover body, and a vertical wall is arranged on an edge of the ring-shaped hole skipping the notch; a first cover is arranged on the vertical wall; an opening corresponding to the notch is arranged on the first cover; and a hole corresponding to the notch is arranged on the cover body; the notch, the opening and the hole form a guide hole, and the guide channel is arranged on the guide hole.

According to the painting mixing cup, the vertical wall and the first cover are higher than the cover body to form a convex platform reinforcing portion; and the opening is located above the notch.

According to the painting mixing cup, the vertical wall and the first cover are lower than the cover body to form a concave platform reinforcing portion, and the opening is located below the notch.

According to the painting mixing cup, an outer contour of the guide channel is a part of a cylindrical shape or a conical shape; an outlet of the guide channel is obliquely arranged in a direction from the outer edge of the cover body to the reinforcing portion, and the outlet is ellipse-shaped; and an end of the outlet near the outer edge of the cover body is higher than another end of the outlet near the reinforcing portion.

According to the painting mixing cup, a gap is formed between the clamping sealing structure and the guide channel.

According to the painting mixing cup, both the guide cover and the cup body are formed by injection molding at one time; both the guide channel and the balanced air hole are arranged with sealing plugs; both the cover body and the first cover are set as circular-shaped; and the guide channel and the balanced air hole are located at a same diameter of the cover body.

The painting mixing cup with guide function of the present disclosure realizes sealing by the cooperation between the inner surface of the first ring-shaped plate and the ring-shaped sealing surface, realizes a second sealing by the cooperation between the accommodation space and the flanging, and also realizes the locking function by the clamping cooperation between the ring-shaped ridge and the fifth ring-shaped plate, to complete the cover of the painting mixing cup. In addition, the guide channel of the guide cover and the balanced air hole ensure the smoothness of the paint flowing. Due to the twice sealing, the paint does not pollute the upper edge of the painting mixing cup, which avoids the adhesion between the cup cover and the upper edge of the cup body. Therefore, the guide cover can be used repeatedly.

Further, the reinforcing portion is arranged at the middle part of the guide cover to ensure the cover body does not deform during injection molding and ensure the strength of the guide cover. In addition, a small part of the guide channel is arranged on the edge of the reinforcing portion, so that the guide channel can obtain the support of the reinforcing portion, and most of the rest of the guide channel is arranged on the cover body, thus ensuring that when the paint mixing cup pours paint outward, the guide channel takes the connection part with the cover body as a fulcrum and the connection part with the reinforcing portion as a pull-back point, thus improving the strength and stability of the guide channel when pouring paint. Meanwhile, the balanced air hole is opened when pouring paint to ensure the fluency of pouring paint, and the diameter of the guide channel is much smaller than that of the paint mixing cup, so that the user can accurately control the pouring speed of the paint. Moreover, the guide channel arranged on the cover body has a positioning function, and in the transportation process of the guide covers, the guide covers can be overlapped with each other through the guide channel to save transportation space.

DETAILED DESCRIPTION OF THE EMBODIMENTS

The present disclosure provides a painting mixing cup with guide function. To make the purpose, technical scheme and effect of the present disclosure clearer and more definite, the present disclosure is further explained in detail below. It should be understood that the specific embodiments described here are only used to explain the present disclosure, and are not used to limit the present disclosure.

Figure 8:
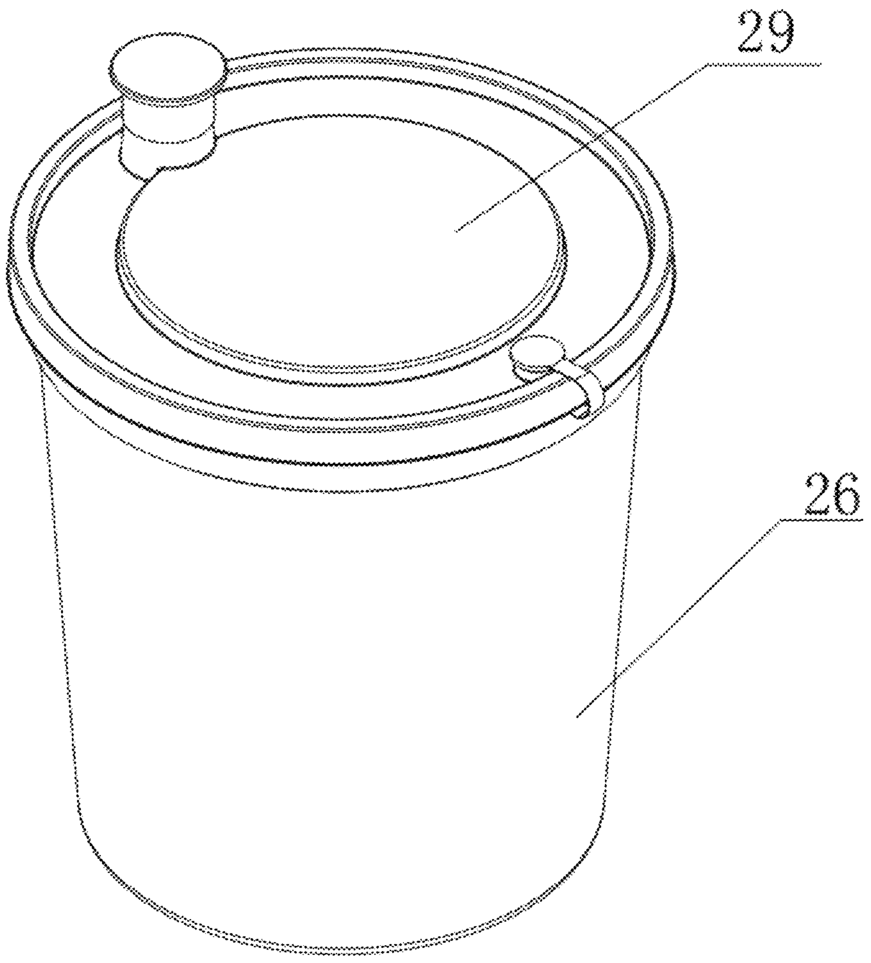
FIG. 8 is a schematic diagram of assembly of a paint mixing cup of the present disclosure.
Figure 9:
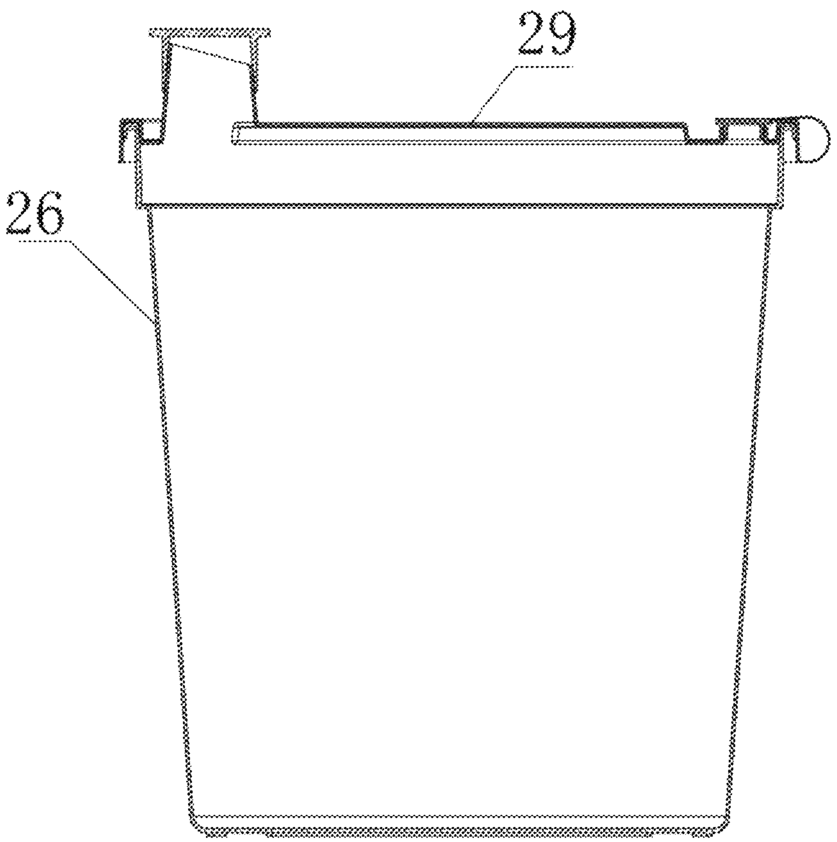
FIG. 9 is an explosion schematic diagram of a paint mixing cup of the present disclosure.
Figure 10:
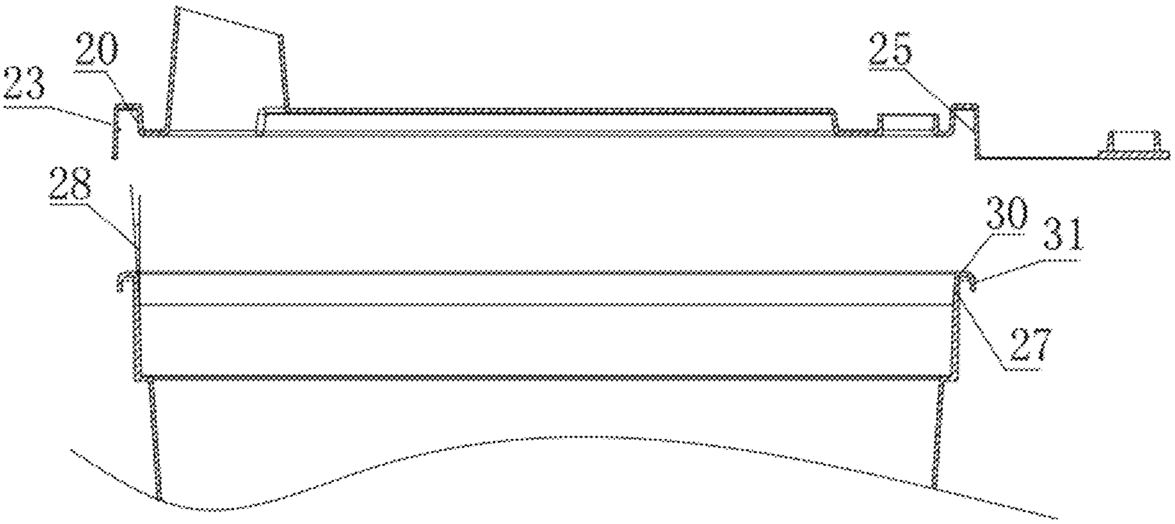
FIG. 10 is a sectional schematic diagram of a paint mixing cup of the present disclosure.

The present disclosure provides a painting mixing cup with guide function, as shown in FIGS. 8-10, including a cup body 26, wherein a ring-shaped sealing surface 27 is arranged on an inner surface of an upper edge of the cup body 26. A clip angle 28 between the ring-shaped sealing surface 27 and a vertical plane is 2°~6°; the cup body 26 is arranged with a guide cover 29, and the guide cover 29 includes a clamping sealing structure 18. An inner surface of a first ring-shaped plate 20 of the clamping sealing structure 18 cooperates with the ring-shaped sealing surface 27 to form a sealing structure. More specifically, the clip angle 28 is 4°, and an inclination of the first ring-shaped plate 20 is also 4°, which matches each other. It is more convenient to demould and does not affect the visual sense of the product.

Furthermore, as shown in FIG. 9, a fourth ring-shaped plate 30 is horizontally arranged on an upper edge of the cup body 26; and a fifth ring-shaped plate 31 is vertically arranged on an outer edge of the fourth ring-shaped plate 30. A flanging is formed between the fourth ring-shaped plate 30 and the fifth ring-shaped plate 31, and the flanging is adapted to the clamping sealing structure 18.

The clamping sealing structure 18 can adopt a technical way known in the prior art, needs to match the upper edge of the paint mixing cup, and can be adjusted accordingly according to the structure of the paint mixing cup. Here is only one embodiment to illustrate, but it should not be limited to the embodiments cited in the present disclosure. The guide cover 29 includes a cover body 1, and the clamping sealing structure 18 is arranged at the outer edge of the cover body 1. The clamping sealing structure 18 includes the first ring-shaped plate 20 vertically arranged along the outer edge of the cover body 1, a second ring-shaped plate 21 is horizontally arranged at an upper edge of the first ring-shaped plate 20, a third ring-shaped plate 23 is vertically arranged at an outer edge of the second ring-shaped plate 21; a length of the third ring-shaped plate 23 is greater than a length of the first ring-shaped plate 20; an accommodation space 24 matched with the upper edge of the cover body 1 is formed between the first ring-shaped plate 20 and the third ring-shaped plate 23, and the accommodation space 24 is used for accommodating the flanging. A ring-shaped ridge 25, matched with a lower edge of the fifth ring-shaped plate 31, is arranged on the third ring-shaped plate 23, so that the guide cover 29 is locked with the cup body 26 by the fifth ring-shaped plate 31, the accommodation space 24 and the ring-shaped ridge 25; and a surface seal is formed by an inner surface of the first ring-shaped plate 20 and the ring-shaped sealing surface 27, a second seal is formed by the accommodation space 24 and the flanging, and the locking function is realized by the ring-shaped ridge 25 and the fifth ring-shaped plate 31.

Figure 1:
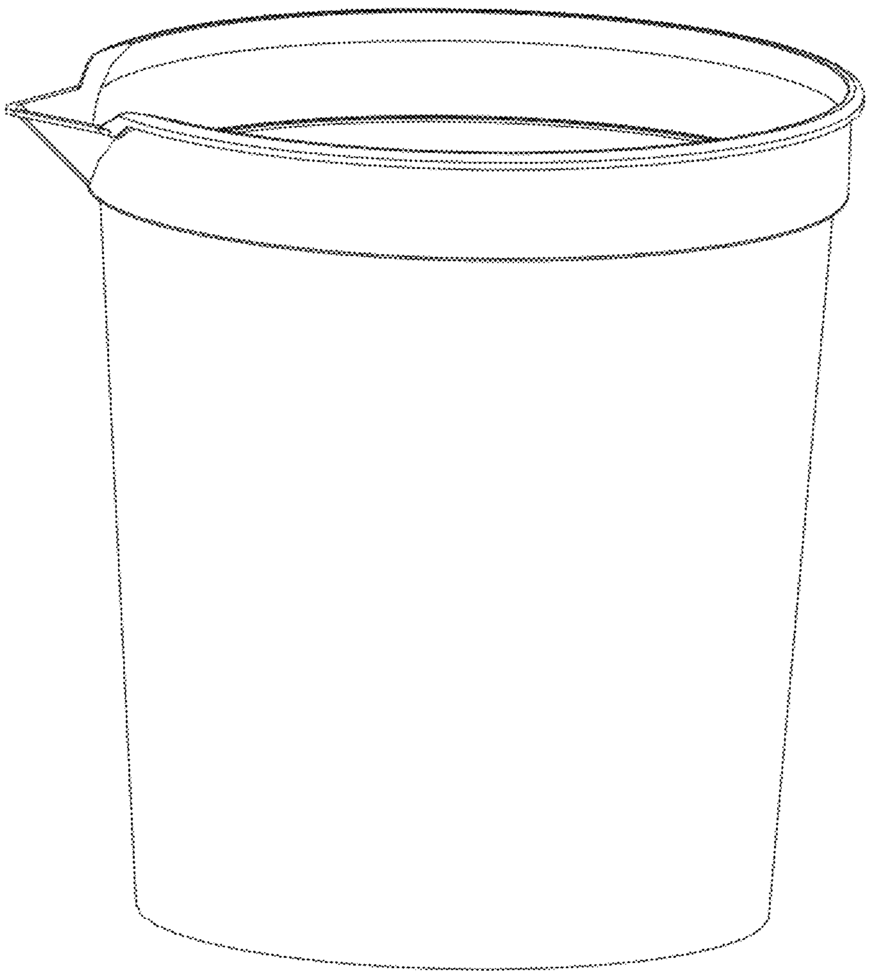
FIG.1 (Prior Art)
FIG. 1 is a schematic diagram of a paint mixing cup in prior art.
Figure 2:
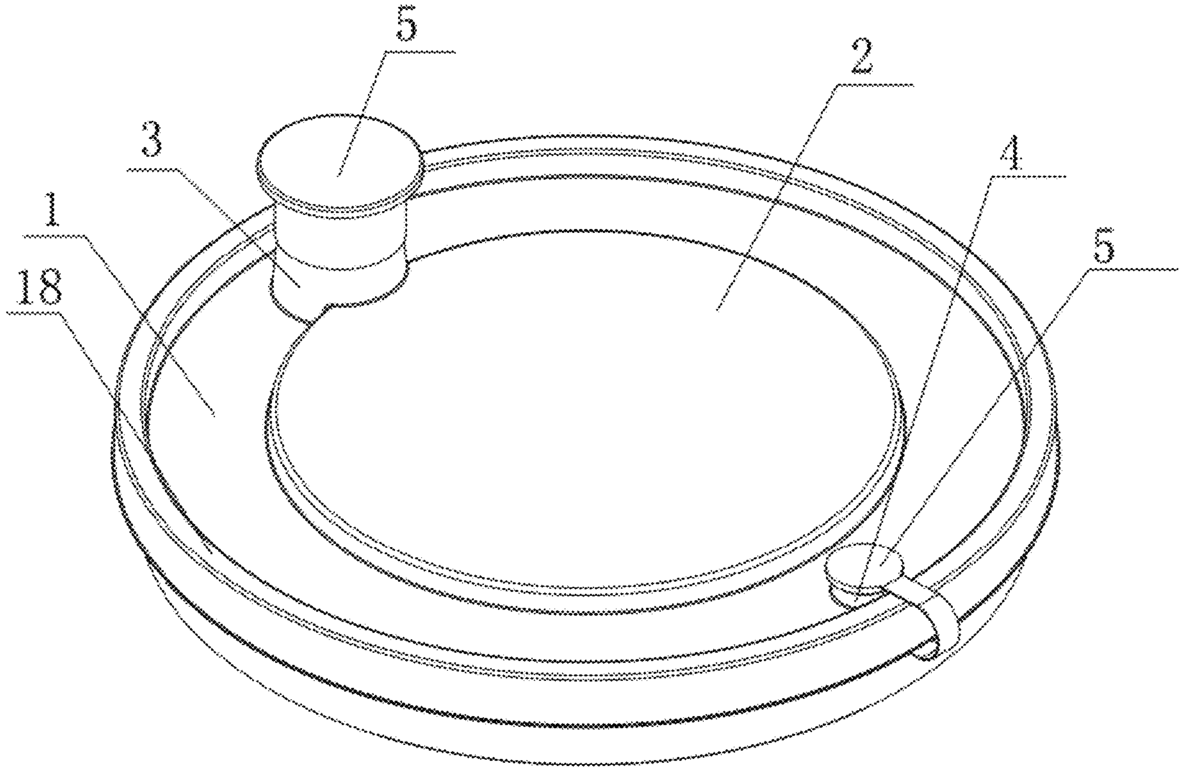
FIG. 2 is a schematic diagram of assembly of a guide cover of the present disclosure.

As shown in FIG. 2, the guide cover 29 includes a cover body 1 for sealing the paint mixing cup, and the cover body 1 is arranged with a reinforcing portion 2 and a guide channel 3; a portion of the guide channel 3 is arranged on the reinforcing portion 2 and a remaining portion of the guide channel 3 is arranged on the cover body 1. A balanced air hole 4 is arranged on a corresponding position of the cover body 1. The guide channel 3 and the balanced air hole 4 are arranged with sealing plugs 5, respectively. When in use, the sealing plugs 5 are taken off, and both the guide channel 3 and the balanced air hole 4 are in an open state. When a user tilts the paint mixing cup, paint material flows out of the guide channel 3, and the user can adjust the flow rate of the guide channel 3 by adjusting the tilting angle of the paint mixing cup, and the guide channel 3 only pollute the environment around the outlet, thus greatly avoiding the situation of large-area pollution of the cup mouth of the paint mixing cup in the prior art. When not in use, the sealing plugs 5 block the guide channel 3 and the balanced air hole 4, so that even if the paint mixing cup is knocked down or in a misoperation state, the paint material is not wasted in a large area.

Figure 6:
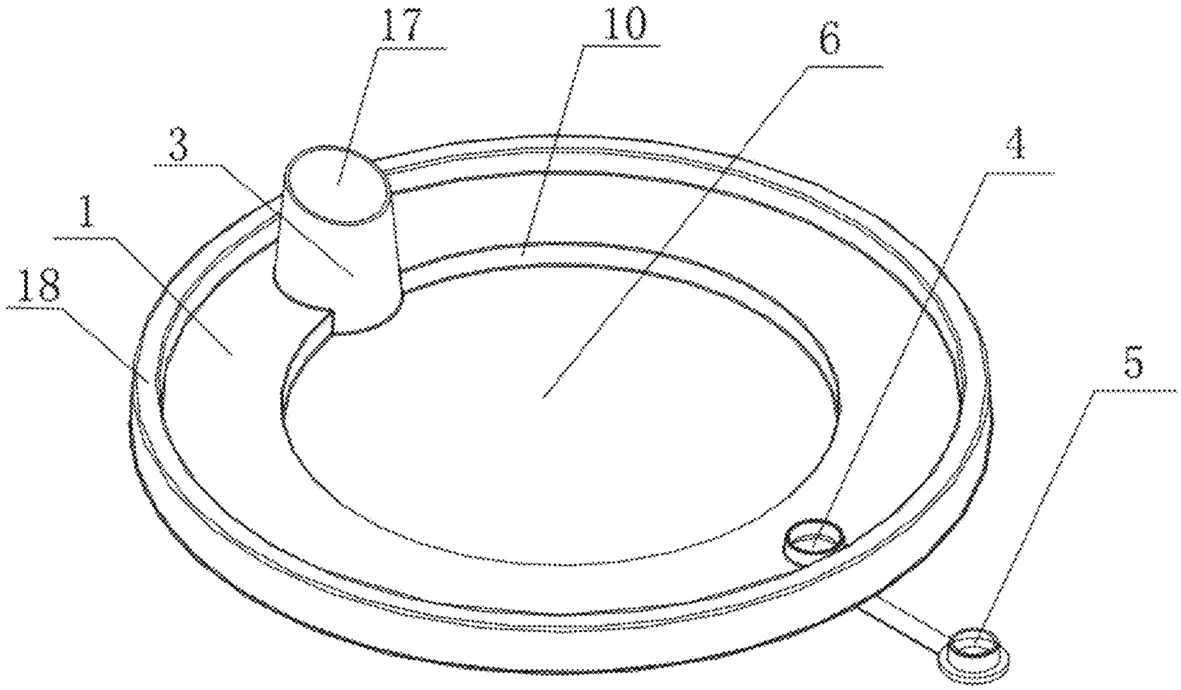
FIG. 6 is a schematic diagram of a guide cover with a concave platform of the present disclosure.
Figure 7:
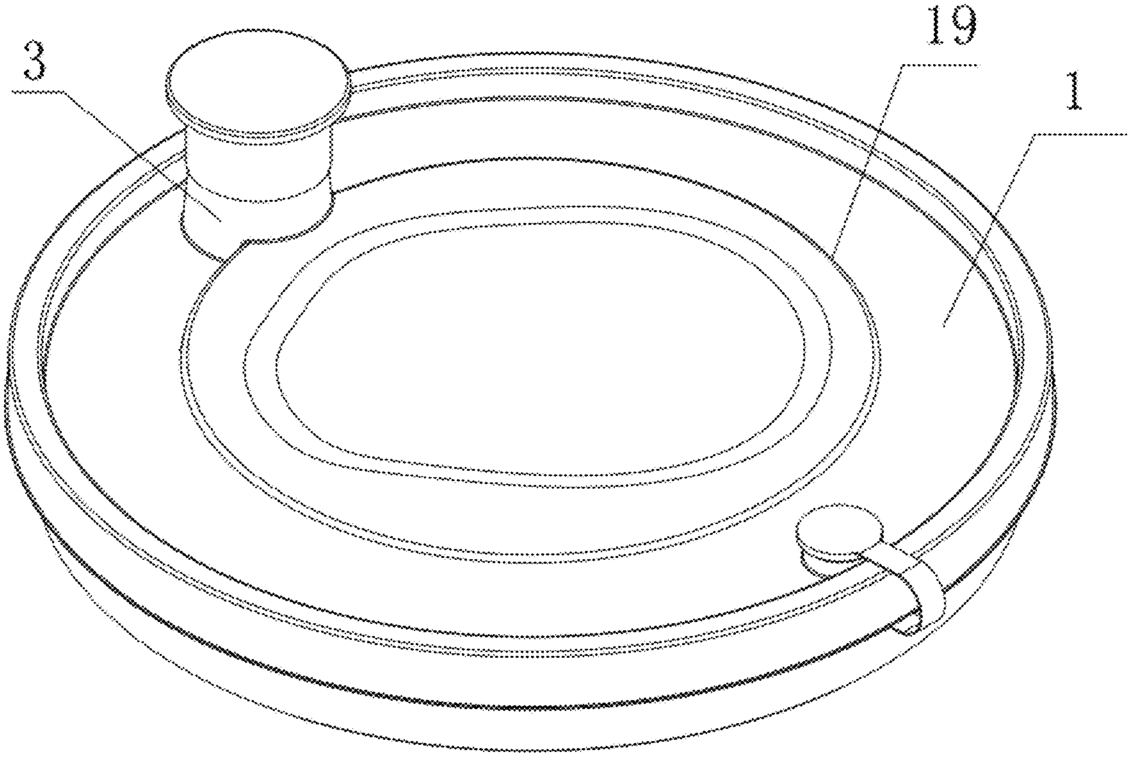
FIG. 7 is a schematic diagram of a guide cover with a reinforcing rib of the present disclosure.

To further describe the present disclosure, the reinforcing portion can be realized in various ways, such as a convex platform reinforcing portion 2 (as shown in FIG. 2), a concave platform reinforcing portion 6 (as shown in FIG. 6), or reinforcing ribs 19 (as shown in FIG. 7). Of course, it is not limited to the ways listed in the present disclosure, and other ways can be adopted to realize the reinforcing portion.

Figure 3:
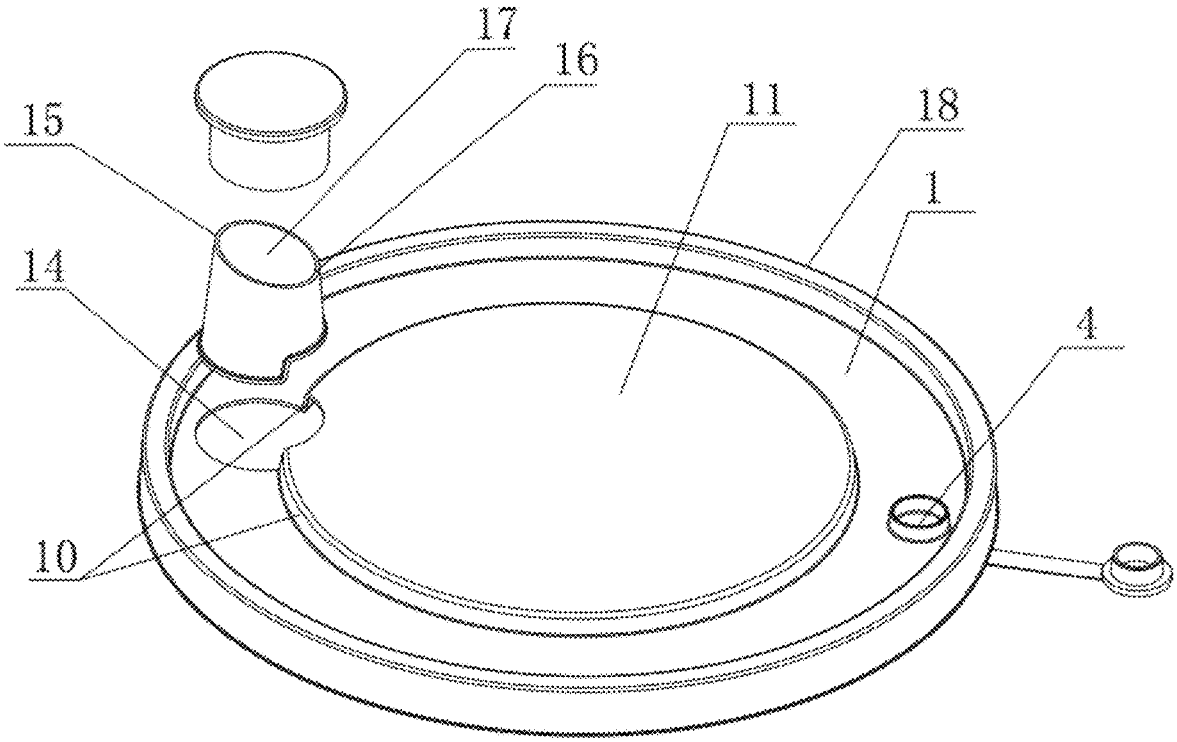
FIG. 3 is an explosion schematic diagram of a guide cover of the present disclosure.
Figure 4:
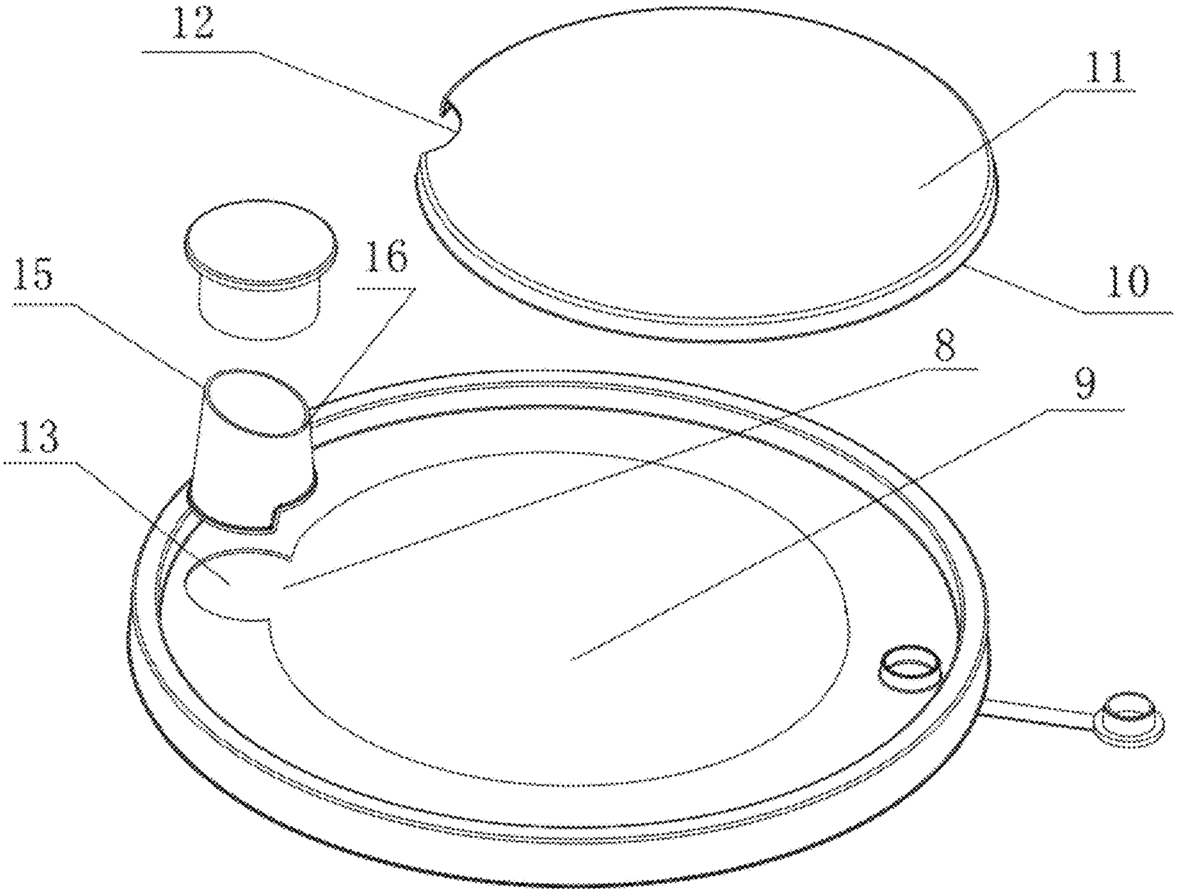
FIG. 4 is an explosion schematic diagram of a guide channel of the present disclosure.
Figure 5:
FIG. 5 is a sectional schematic diagram of a guide cover of the present disclosure.

As shown in FIGS. 2-4, a ring-shaped hole 9 with a notch 8 is arranged at the middle part of the cover body 1, and a vertical wall 10 is arranged on the edge of the ring-shaped hole 9 skipping the notch 8. A first cover 11 is arranged on the vertical wall 10; an opening 12 corresponding to the notch 8 is arranged on the first cover 11; a hole 13 corresponding to the notch 8 is arranged on the cover body 1, that is, the hole 13 is connected to the notch 8, and the notch 8, the opening 12 and the hole 13 form a guide hole 14. Specifically, the notch 8, the opening 12, the hole 13 and the lacking part of the vertical wall form the guide hole 14, and the guide channel 3 is arranged on the guide hole 14. In addition, the vertical wall 10 and the first cover 11 are higher than the cover body 1 to form the convex platform reinforcing portion, on which the opening 12 is located above the notch 8. That is, the part (also called the lower edge) of the guide channel 3 on the cover body 1 is lower than the part (also called the upper edge) of the reinforcing portion 2. On the premise of the above advantages, when the paint mixing cup is poured, the paint first contacts the lower edge of the guide channel 3, while the upper edge of the guide channel 3 exhausts a small amount of air during dumping, forming a buffer, which further improves the smoothness of the paint flowing. In addition, the paint contaminated on the inner surface of the first cover 11 flows into the guide channel 3 along the opening 12, thus avoiding the paint residue contaminated on the inner surface of the first cover 11 after pouring paint.

Furthermore, an outer contour of the guide channel 3 is a part of a cylindrical or a conical, most preferably a conical part. As shown in FIGS. 3 and 4, an outlet 17 of the guide channel 3 is obliquely arranged from the outer edge of the cover body 1 to the reinforcing portion 2, and an end 15 of the outlet 17 near the outer edge of the cover body 1 is higher than another end 16 of the outlet 17 near the reinforcing portion 2, and the outlet 17 is ellipse-shaped. When the paint mixing cup returns to the vertical state after the paint is poured, because the opening 12 is located above and behind the hole 13, at this time, part of the air enters the opening 12 first, and the higher end 15 blocks the paint outflow, and the lower end 16 blocks the paint outflow more smoothly under the paint's gravity and in cooperation with the opening 12, and ensures that the paint does not overflow when the flow is stopped, so that the flow is stopped more stable.

To further ensure that the guide cover 29 does not deform during demoulding and maintains its strength, the cover body 1 is set as circular-shaped, and the reinforcing part also is set as circular-shaped, that is, a center of the cover body 1 and a center of the first cover 11 are located on the same straight line, and a diameter of the first cover 11 is one third to two thirds of the diameter of the cover body 1, which not only ensures that the guide cover 29 does not deform during demoulding, but also ensures the use strength of the guide cover 29.

In addition, a gap is formed between the clamping sealing structure 18 and the guide channel 3, which ensures the strength of the guide channel 3, and ensures that the clamping sealing structure 18 and the guide channel 3 do not shrink during molding and demoulding.

In addition, the convex platform reinforcing portion 2 is higher than the cover body 1, and the outlet 17 is inclined to the direction of the convex platform reinforcing portion 2, so when the sealing plug 5 is inserted into the guide channel 3, If the force is too large, the guide channel 3 bends to the direction of the convex platform reinforcing portion 2 to release the force, thus avoiding the overturning of the paint mixing cup caused by the excessive force. Furthermore, the higher end 15 is higher than the height of the clamping sealing structure 18 to ensure that the paint is smoothly led out and does not remain on the outer surface of the cover body 1, thereby reducing the pollution surface of the paint mixing cup during the paint pouring process. In addition, both the guide channel 3 and the convex platform reinforcing portion 2 protrude upward in the same direction, so that positioning is carried out by the guide channel 3, and the upper and lower adjacent convex platform reinforcing portions 2 are exactly buckled together, so that positioning can be realized by the guide channel 3 in the transportation process of the guide covers, so that a plurality of guide covers are overlapped together to save transportation space.

In another embodiment, as shown in FIG. 6, the vertical wall 10 and the first cover 11 are lower than the cover body 1 to form the concave platform reinforcing portion 6, and the opening 12 is located below the notch 8. The general situation is basically the same as the above-mentioned embodiment, so it is not detailed here. The difference is that the concave platform reinforcing portion 6 is concave to invade the volume of the paint mixing cup when the guide cover is buckled on the paint mixing cup, so the height of the concave platform reinforcing portion 6 needs to be controlled more accurately.

In another embodiment, the reinforcing portion includes at least one ring-shaped reinforcing rib 19. As shown in FIG. 7, the reinforcing portion includes two ring-shaped reinforcing ribs 19; part of the guide channel 3 is arranged on the outer ring-shaped reinforcing rib 19. The ring-shaped reinforcing rib 19 is located in the middle of the cover body 1. The difference is that, when using ring-shaped reinforcing ribs 19, due to the different wall thicknesses, the ring-shaped reinforcing ribs 19 and the cover body 1 may shrink, which may lead to the deformation of the guide cover.

In another embodiment, the guide cover is formed by injection molding at one time, which reduces the cost and improves the machining accuracy. Of course, other technology can also be used. Both the cover body 1 and the first cover 11 are circular-shaped. Moreover, the balanced air hole 4 is generally arranged on the cover body 1, and the closer it is to the first ring-shaped plate 20, the better.

However, a gap is arranged between the side wall of the balanced air hole 4 and the outer surface of the first ring-shaped plate 20, which avoids shrinkage during injection molding. Moreover, the guide channel 3 and the balanced air hole 4 are located at the same diameter of the cover body, which is the best embodiment. No matter how the cover body 1 rotates, the distance between the guide channel 3 and the balanced air hole 4 is always in the farthest state, especially when the convex platform reinforcement is used, even if the paint in the paint mixing cup is full, the paint does not pour out from the balanced air hole 4 when pouring the paint, thus improving the stability of use.

Of course, the above-mentioned description is just preferred embodiments of the present disclosure and the present disclosure is not limited to enumerating the above embodiments. It should be noted that all equivalent substitutions and obvious variants made by anyone skilled in the field under the teaching of this description fall within the essential scope of the present disclosure and should be protected by the present disclosure.

What is claimed is:

1. A paint mixing cup with guide function, comprising a cup body, wherein a ring-shaped sealing surface is arranged on an inner surface of an upper edge of the cup body, and a clip angle between the ring-shaped sealing surface and a vertical plane is 2°~6°; the cup body is arranged with a guide cover, and the guide cover includes a clamping sealing structure, and an inner surface of a first ring-shaped plate of the clamping sealing structure cooperates with the ring-shaped sealing surface to form a sealing structure;

a fourth ring-shaped plate is horizontally arranged on the upper edge of the cup body and a fifth ring-shaped plate is vertically arranged on an outer edge of the fourth ring-shaped plate; a flanging is formed by the fourth ring-shaped plate and the fifth ring-shaped plate, and the flanging is matched with the clamping sealing structure;

the guide cover comprises a cover body, and the clamping sealing structure is arranged at an outer edge of the cover body; the clamping sealing structure comprises the first ring-shaped plate vertically arranged along the outer edge of the cover body, a second ring-shaped plate is horizontally arranged at an upper edge of the first ring-shaped plate, a third ring-shaped plate is vertically arranged at an outer edge of the second ring-shaped plate; a length of the third ring-shaped plate is greater than a length of the first ring-shaped plate; an accommodation space matched with an upper edge of the paint mixing cup is formed between the first ring-shaped plate and the third ring-shaped plate, and the accommodation space is used for accommodating the flanging; a ring-shaped ridge, matched with a lower edge of the fifth ring-shaped plate, is arranged on the third ring-shaped plate;

wherein a reinforcing portion and a guide channel arranged on the cover body; a portion of the guide channel is arranged on the reinforcing portion, and a remaining portion of the guide channel is arranged on the cover body; and a balanced air hole is arranged on a corresponding position of the cover body.

2. The paint mixing cup according to claim 1, wherein a ring-shaped hole with a notch arranged at middle part of the cover body, and a vertical wall is arranged on an edge of the ring-shaped hole skipping the notch; a first cover is arranged on the vertical wall; an opening corresponding to the notch is arranged on the first cover; a hole corresponding to the notch is arranged on the cover body; the notch, the opening, and the hole form a guide hole; and the guide channel is arranged on the guide hole.

3. The paint mixing cup according to claim 2, wherein the vertical wall and the first cover are higher than the cover body to form a convex platform reinforcing portion; and the opening is located above the notch.

4. The paint mixing cup according to claim 2, wherein the vertical wall and the first cover are lower than the cover body to form a concave platform reinforcing portion, and the opening is located below the notch.

5. The paint mixing cup according to claim 2, wherein the guide cover and the cup body are formed by injection molding at one time; both the guide channel and the balanced air hole are arranged with sealing plugs; both the cover body and the first cover are set as circular-shaped; and the guide channel and the balanced air hole are located at the same diameter of the cover body.

6. The paint mixing cup according to claim 1, wherein an outer contour of the guide channel is a part of a cylindrical or a conical; an outlet of the guide channel is obliquely arranged from the outer edge of the cover body to the reinforcing portion, and the outlet is ellipse-shaped, and an end of the outlet near the outer edge of the cover body is higher than another end of the outlet near the reinforcing portion.

7. The paint mixing cup according to claim 1, wherein a gap is formed between the clamping sealing structure and the guide channel.

* * * * *